(12) United States Patent
Kong et al.

(10) Patent No.: US 11,600,173 B2
(45) Date of Patent: Mar. 7, 2023

(54) DEVICES, SYSTEMS, AND METHODS FOR DRIVING INCENTIVIZATION

(71) Applicants: VOLKSWAGEN AG, Wolfsburg (DE); AUDI AG, Ingolstadt (DE); PORSCHE AG, Stuttgart (DE)

(72) Inventors: Liang Kong, Santa Clara, CA (US); Joerg Christian Wolf, Foster City, CA (US)

(73) Assignees: Volkswagen AG; Audi AG; Porsche AG

( * ) Notice: Subject to any disclaimer, the term of this patent is extended or adjusted under 35 U.S.C. 154(b) by 219 days.

(21) Appl. No.: 16/507,810

(22) Filed: Jul. 10, 2019

(65) Prior Publication Data
US 2021/0012652 A1   Jan. 14, 2021

(51) Int. Cl.
*G08G 1/01* (2006.01)
*G08G 1/052* (2006.01)
(Continued)

(52) U.S. Cl.
CPC .......... *G08G 1/0145* (2013.01); *G06Q 20/10* (2013.01); *G08G 1/0125* (2013.01); *G08G 1/052* (2013.01); *G08G 1/0962* (2013.01)

(58) Field of Classification Search
CPC .... G08G 1/0145; G08G 1/0125; G08G 1/052; G08G 1/0962; G08G 1/096783; G08G 1/096716; G08G 1/096861; G08G 1/0967; G08G 1/09623; G08G 1/0968; G06Q 20/10; G06Q 50/30; G06Q 30/0207; H04L 67/12; B60W 2050/146; B60W 20/11; B60W 30/0956; B60W 40/04; B60W 2554/406; B60W 2554/408; B60W 60/0011; H04W 4/44; B60K 35/00; B60K 2370/152; B60K 2370/589; B60K 2370/592; G05B 2219/32334; G05B 2219/33056; G05D 1/0214; G05D 1/0217; G05D 1/0223
See application file for complete search history.

(56) References Cited

U.S. PATENT DOCUMENTS 9,892,573 B1   2/2018   Hsu-Hoffman et al.
10,950,123 B2  3/2021   Nishioka et al.
(Continued)

FOREIGN PATENT DOCUMENTS

CN   102024335 A   4/2011
CN   102529974 A   7/2012
(Continued)

OTHER PUBLICATIONS

Search Report for European Patent Application No. 20184892.6; dated Nov. 26, 2020.
(Continued)

*Primary Examiner* — Abby Y Lin
*Assistant Examiner* — Esvinder Singh
(74) *Attorney, Agent, or Firm* — Barnes & Thornburg LLP (57) ABSTRACT

Devices, systems, and methods related to incentives for complying with suggested driving operations can include determining suggested driving operations, determining a desirability of the suggested driving operations, communicating the desirability of the suggested driving operations, and optionally monitoring compliance with the suggested driving operations.

21 Claims, 4 Drawing Sheets

(51) Int. Cl.
*G08G 1/0962* (2006.01)
*G06Q 20/10* (2012.01)

(56) References Cited

U.S. PATENT DOCUMENTS

| | | | |
|---|---|---|---|
| 11,017,665 B1* | 5/2021 | Roy | G08G 1/0965 |
| 2009/0222338 A1 | 9/2009 | Hamilton, II et al. | |
| 2011/0029356 A1* | 2/2011 | Hyde | G06Q 30/0207 |
| | | | 705/14.1 |
| 2011/0068952 A1* | 3/2011 | Srinivasan | G08G 1/127 |
| | | | 340/928 |
| 2013/0090821 A1 | 4/2013 | Abboud et al. | |
| 2013/0110310 A1 | 5/2013 | Young | |
| 2014/0272812 A1 | 9/2014 | Hing et al. | |
| 2015/0106010 A1 | 4/2015 | Martin et al. | |
| 2017/0184411 A1* | 6/2017 | Glasgow | G01C 21/3617 |
| 2017/0305434 A1 | 10/2017 | Ratnasingam | |
| 2018/0174446 A1* | 6/2018 | Wang | G08G 1/017 |
| 2018/0238698 A1 | 8/2018 | Pedersen | |
| 2019/0325743 A1* | 10/2019 | Nishioka | G08G 1/0145 |
| 2019/0361442 A1* | 11/2019 | Izaki | G06K 9/00791 |
| 2020/0160251 A1* | 5/2020 | Wynter | G06Q 10/063112 |
| 2020/0365015 A1* | 11/2020 | Nguyen | G08G 1/0133 |
| 2021/0182993 A1* | 6/2021 | Arian | G06Q 30/0236 |

FOREIGN PATENT DOCUMENTS

| | | |
|---|---|---|
| CN | 108961803 A | 12/2018 |
| EP | 3457086 A1 | 3/2019 |
| JP | 2012022526 A | 2/2012 |
| WO | 2015062635 A1 | 5/2015 |
| WO | 2015094353 A1 | 6/2015 |
| WO | 2018097047 A1 | 5/2018 |
| WO | 2019084012 A1 | 5/2019 |

OTHER PUBLICATIONS

Office Action for Chinese Patent Application No. 202010661506.2; dated Mar. 9, 2022.

Office Action; Chinese Patent Application No. 202010661506.2; dated Oct. 9, 2022.

* cited by examiner

DEVICES, SYSTEMS, AND METHODS FOR DRIVING INCENTIVIZATION

FIELD

The present disclosure relates to systems, components, and methodologies for transportation vehicles. More particularly, the present disclosure relates to systems, components, and methodologies for mitigating traffic impedance through suggested driving operations.

BACKGROUND

Traffic mitigation can be implemented by providing suggested driving operations to the operator of a transportation vehicle. For example, suggesting to the vehicle operator that reducing speed may reduce the likelihood of a traffic jam or backup, can improve throughput of roadways, reduce likelihood of unnecessary stopping, intense braking, and/or avoidable accelerations. However, vehicle operators may not be inclined to heed such suggestions, and opportunities to improve traffic flow may be missed.

SUMMARY

Disclosed embodiments provide a method of incentivizing desirable driving habits for a user of a transportation vehicle which may comprise determining, by a processor, a suggested driving operation of the transportation vehicle to reduce traffic impedance, communicating the suggested driving operation to the user for execution, determining a value of desirability of the suggested driving operation, and presenting the value of desirability, via at least one user interface, to the user to encourage compliance with the suggested driving operation. In disclosed embodiments, communicating the suggested driving operation to the user may include outputting the suggested driving operation onto the at least one user interface including a display for presentation to the user.

In disclosed embodiments, presenting the value of desirability may include presenting an accumulated compliance value determined according to the value of desirability. Determining the value of desirability may include determining a severity of the traffic impedance. The suggested driving operation may be determined based on the severity of the traffic impedance. In discloses embodiments, the method may further comprise verifying compliance with the suggested driving operation.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION OF THE DISCLOSED EMBODIMENTS

Transportation systems, including transportation vehicles and networks are increasing in sophistication. For example, transportation vehicles are providing computerized operation, including in autonomous features of operation, whether assistive, partly or fully autonomous, but also in terms of on-board user information resources and interfaces. One area of growth includes providing drivers with suggestions for operation.

For example, by determining the status of a traffic signal such as a traffic lamp, the driver may be suggested to reduce speed so as to allow a stop light (red) to progress to a go light (green), avoiding unnecessarily intense braking or stopping at the traffic signal, and subsequent reacceleration. However, merely providing such suggestions to drivers may not impart enough desire to the driver to consistently perform the suggested operation. Providing incentivization correlated with the operation to the driver can assist in prompting the suggested operation.

Figure 1:
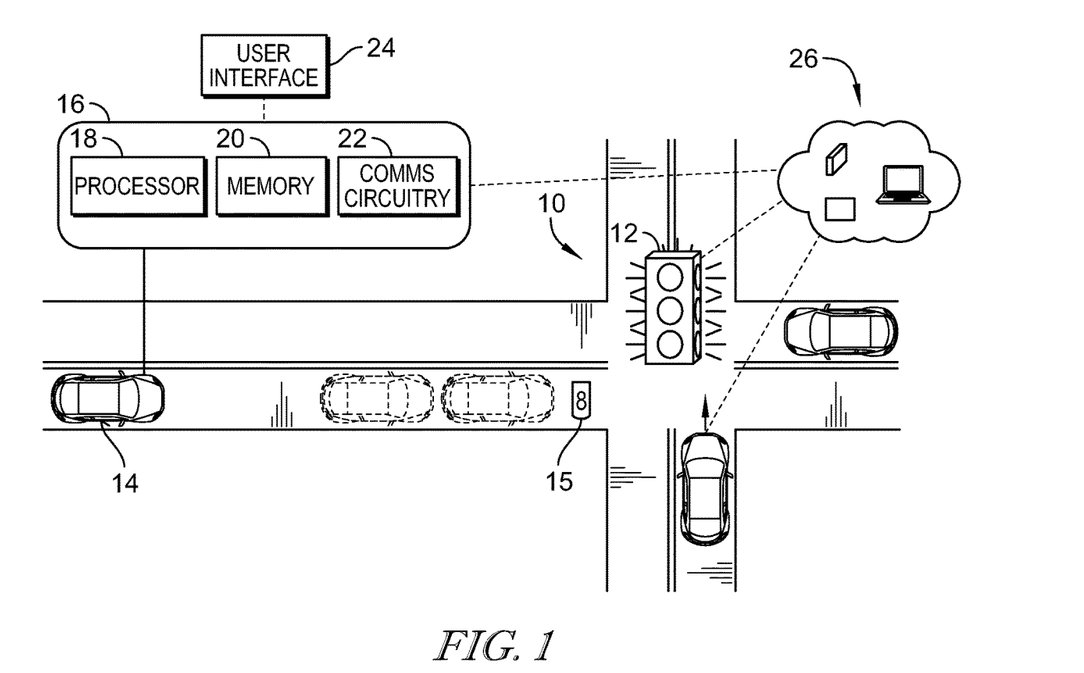
FIG. 1 is an overhead plan view of a transportation vehicle approaching an intersection having a traffic signal, showing that the transportation vehicle includes a control system for providing suggested driving operations.

Referring to FIG. 1, a traffic intersection 10 is shown as a four way intersection having a traffic signal 12 which may include traffic sensor loops 15 which may provide inputs to the traffic signal operation. A subject transportation vehicle 14 is approaching the intersection 10 and may be configured for providing suggested driving operations to the driver. The transportation vehicle 14 may include a control system 16 having processor 18 for executing instructions stored on a memory 20 to determine commands, and communication circuitry 22 for sending and receiving communication signals with other vehicle systems based on command of the processor 18. The control system 16 may be arranged in communication with a user interface 24, illustratively embodied as a touch screen display.

In the illustrative embodiment, the control system 16 may be arranged in communication (e.g., via communication circuitry 22) with a traffic information system 26 to receive communication of traffic signal information. The traffic information system 26 may include servers, databases, and/or terminals for obtaining and/or developing traffic signal information and be formed as governmental traffic authority communication system and/or as a third-party system obtaining information from various traffic resources to assist in determining operation of traffic signal 12. The control system 16 may receive traffic signal information and may determine a suggested driving operation based on the received traffic signal operation. In some embodiments, the control system 16 may estimate traffic signal operation with or without information from a traffic information system.

Figure 2:
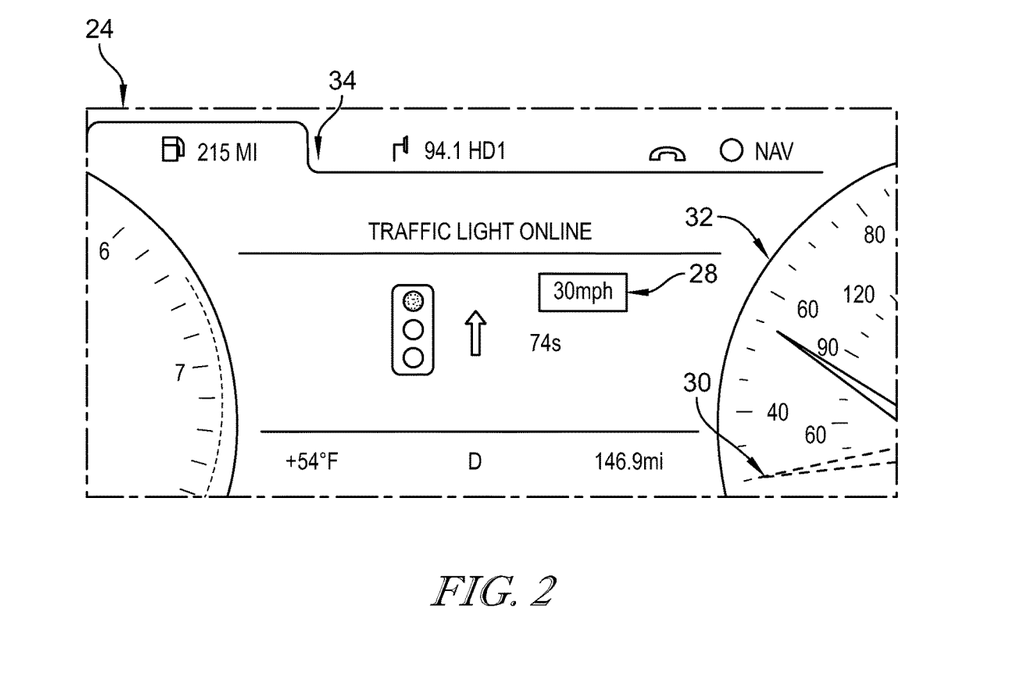
FIG. 2 is a diagrammatic view of a dashboard of a user interface of the vehicle of FIG. 1 showing that the suggested driving operation may include a reduced speed to allow time for the traffic signal to change to green to reduce and/or avoid unnecessary stopping and/or intense braking.

Referring to FIG. 2, continuing from the example, the control system 16 may determine operation of the traffic signal 12 for determining a suggested driving operation. In the example, the control system 16 has determined that the traffic signal 12 will turn to green for the transportation vehicle 14 in about 74 seconds. Based on the operation of the traffic signal 12 the control system 16 may determine a suggested driving operation including a suggested speed of 30 mph which is determined to be a sufficiently low speed to allow the traffic signal 12 to advance to green and reduce and/or avoid the need for a stop by vehicle 14. The control system 16 may communicate with the user interface 24, embodied to include a dashboard screen 34, to indicate the 30 mph suggestion numerically 28, and/or as a graphic 30 embodied as an indicator line on the speedometer 32.

In the present example, the vehicle 14 is the only vehicle traveling in the lane and in the eastbound direction (left to right in FIG. 1). Accordingly, for descriptive purposes the potential traffic impedance of requiring a stop at a stop light is relatively simple. However, when additional vehicles may be following behind the vehicle 14, if the vehicle 14 follows the suggested driving operation to slow to 30 mph, the avoided traffic impedance is increased because additional vehicles may likewise reduce speed and may avoid unnecessary stops and/or excessive braking. Accordingly, the traffic impedance impact of one vehicle following suggested driving operations can echo among other vehicles and provide benefits greater than its individual contribution.

Figure 3:
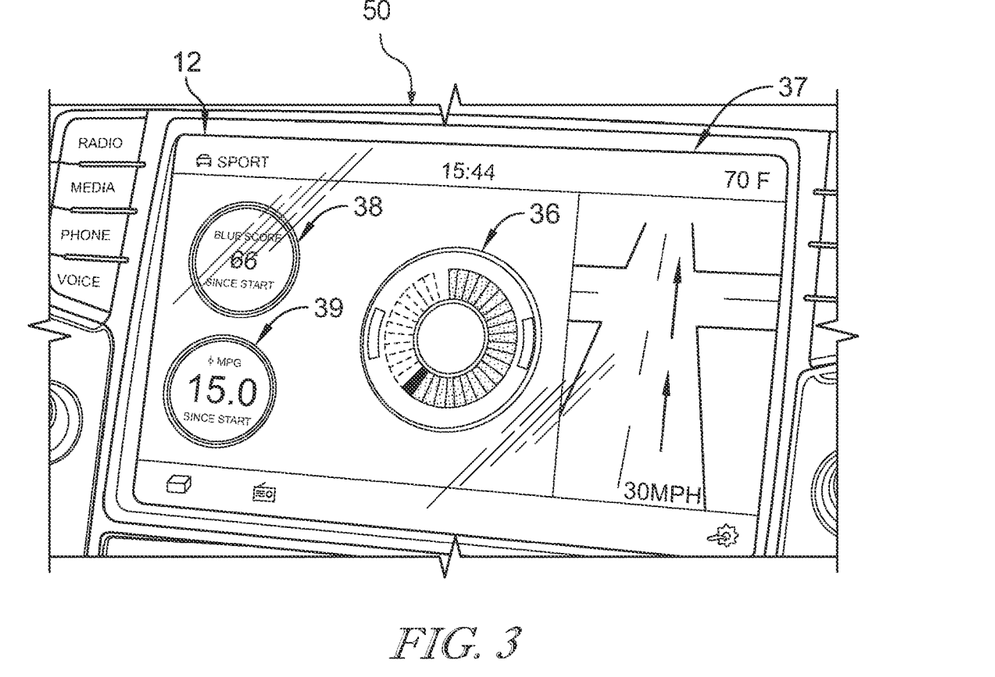
FIG. 3 is an infotainment display of the user interface of the vehicle of FIG. 1 showing that a desirability of the suggested driving operation may be presented to the vehicle operator indicating an increase in accumulated score to incentivize compliance with the suggested driving operation.

Referring now to FIG. 3, the control system 16 may determine a desirability of the suggested driving operation. The desirability may be determined as a quantitative value of desirability of the suggested driving operation based on the severity of traffic impedance and/or the potential for avoidance of traffic impedance. For example, if the transportation vehicle 14 is in a highly congested scenario, its driving choices make have greater effect on traffic impedance than at less congested times. In some embodiments, the severity of traffic may be determined according to various traffic information criteria, for example, the activity of traffic sensor loops 15 and/or social network-derived speed information. Moreover, the value of desirability may be determined based on the perceived inconvenience to the driver of the transportation vehicle 14. For example, if the suggested driving operation requires a lane change or more pervasive change from the current driving status of the vehicle 14 it may be afforded greater weight of avoidance in traffic impedance.

The control system 16 may communicate the desirability of the suggested driving operation to the driver. The control system 16 may communication with the user interface 12 to present the value of desirability, which may be displayed as within a graphical image 36 and/or a numerical score 38. For example, as shown in FIG. 3, the graphical image 36 is illustratively displayed on an infotainment display 37 of the user interface 12 embodied as a depiction of an accumulated compliance score shown in solid line and presently indicated as 66 out of 100. The value of the desirability of the suggested driving operation is presented to the user as an incremental increase in the accumulated compliance score indicated in broken line to suggest to the user the additional compliance score attainable by compliance with the suggested driving operation. The accumulated compliance score may be assigned to the vehicle 14 itself and/or may be assigned to the particular driver.

By presentation of the value of desirability of the suggested driving operation to the user, the user can be incentivized to comply with the suggested driving operation. The reinforcement of positive behavior with a visual reward can assist to establish psychological positivity of complying with the suggested driving operations, thus, increasing the likelihood of the driver heeding the suggestions. The presentation of the value of desirability can be accompanied by other positive reinforcement information such as indication 39 of fuel economy and/or carbon footprint information. In some embodiments, the value of desirability may be determined based on fuel consumption and/or carbon footprint reduction effects of compliance with the suggestion driving operation.

Figure 4:
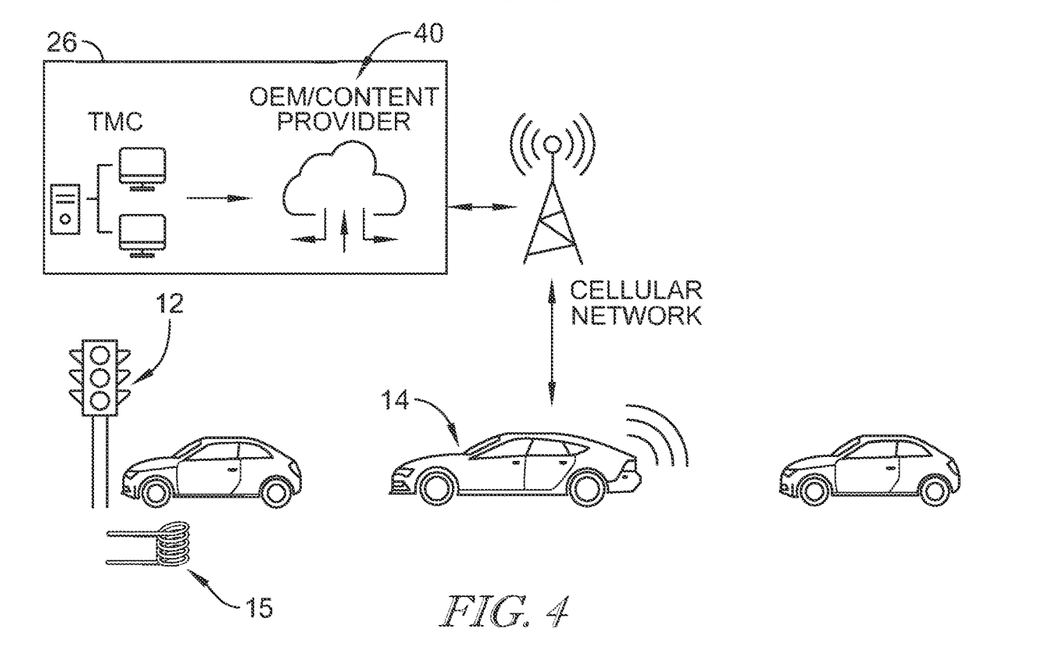
FIG. 4 is diagrammatic illustration of the transportation vehicle in communication with a content provider for receiving information regarding the traffic signal.

Referring now to FIG. 4, compliance with the suggested driving operation may be verified. In the illustrative example, the control system 16 may determine whether the user has complied with the suggested driving operation by monitoring driving operations, such as speed and/or position, relative to predicted driving operations. In some embodiments, a global positioning system may provide vehicle position for comparison to determine whether the driver has complied with the suggested driving operation. In some embodiments, compliance with suggested driving operations may be determined by remote content provider 40 which may be formed as part of the traffic information system 26 in communication with the vehicle 14 via wireless network, e.g., cellular network.

Figure 5:
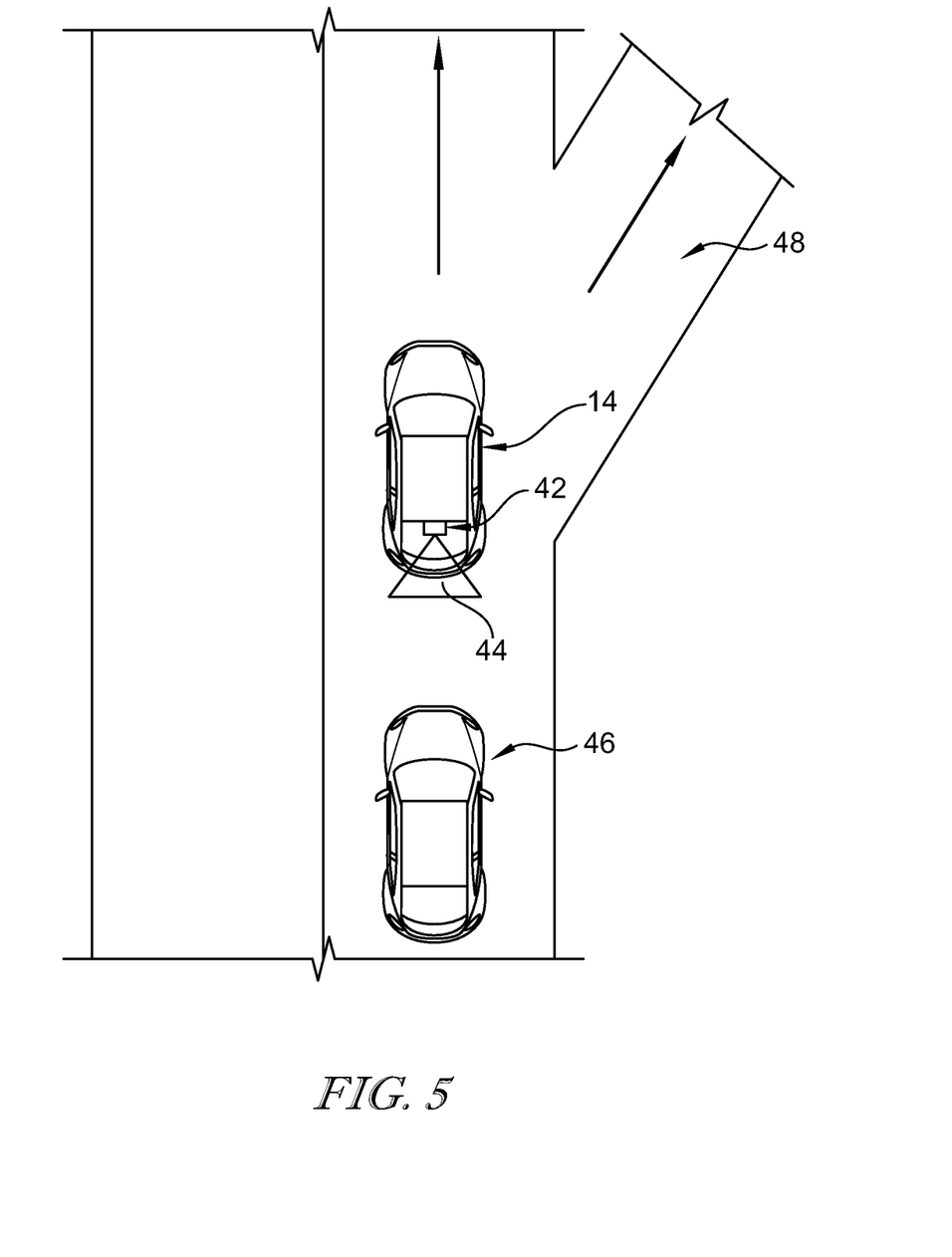
FIG. 5 another overhead plan view of the transportation vehicle illustrating that suggested driving operations may include an alternative route, and showing that the vehicle may communicate compliance with suggested driving operations to other vehicles.

Referring now to FIG. 5, although the suggested driving operation has previously been exemplified as a reduction of speed, in some embodiments, the suggested driving operation may include any suitable driving maneuver to mitigate any suitable traffic impedance (e.g., zipper merge, exiting roadways, changing lanes, etc). Traffic impedance may including existing and/or impending traffic jams. For example, the suggested driving operation may include changes lanes and/or exiting the current road of travel for a detour as illustrated in FIG. 5. In consideration of the existence on roadways of vehicles not having incentivized driving suggestions, the control system 16 may communicate a compliance indication to other vehicles on the roadway. For example, the vehicle 14 may include an indicator 42 embodied as a light source configured to illuminate with pleasurable color of light 44, such as while, blue, or green responsive to compliance with a suggested driving operation to indicate that the vehicle 14 is performing a suggested driving operation. In some embodiments, the control system 16 may communicate directly with interconnected vehicles to indicate compliance with suggested driving operations, for example, by wireless signal for display of a message of compliance within the other interconnected vehicle.

Communication of compliance to other vehicles can provide a variety of benefits, particularly for vehicles without suggested driving operations. For example, vehicles following behind the vehicle 14 may not understand the logic behind the driving maneuvers taken by vehicle 14, for example, if vehicle 14 reduces speed to delay arrival at the traffic signal 12 to avoid a red light, the other vehicle 46 may attempt to overtake or pass the vehicle 14 rather than to follow suit to reduce speed. Similarly, if vehicle 14 complies with a suggestion to take the off-ramp 48 to follow an alternative route, the other vehicle may not appreciate that the alternative route is intended to relieve and/or mitigate existing and/or impending traffic impedance. By communicating that the vehicle 14 is complying with suggested driving operations, the driver of the other vehicle 46 can be encouraged to follow the vehicle 14 to take a corresponding operating to the suggested driving operation, such as by forgoing overtaking of the vehicle 14 or following the vehicle 14 onto the alternative route.

Returning briefly to FIG. 3, route changes included within suggested driving operations may be indicated to the user of the vehicle 14 via a navigation screen 50. The navigation screen 50 may be presented with the representation of the value of desirability 36, 38 in split screen on the infotainment display 37. In some embodiments, navigation and incentivization indications may be provided on separate display screens.

Figure 6:
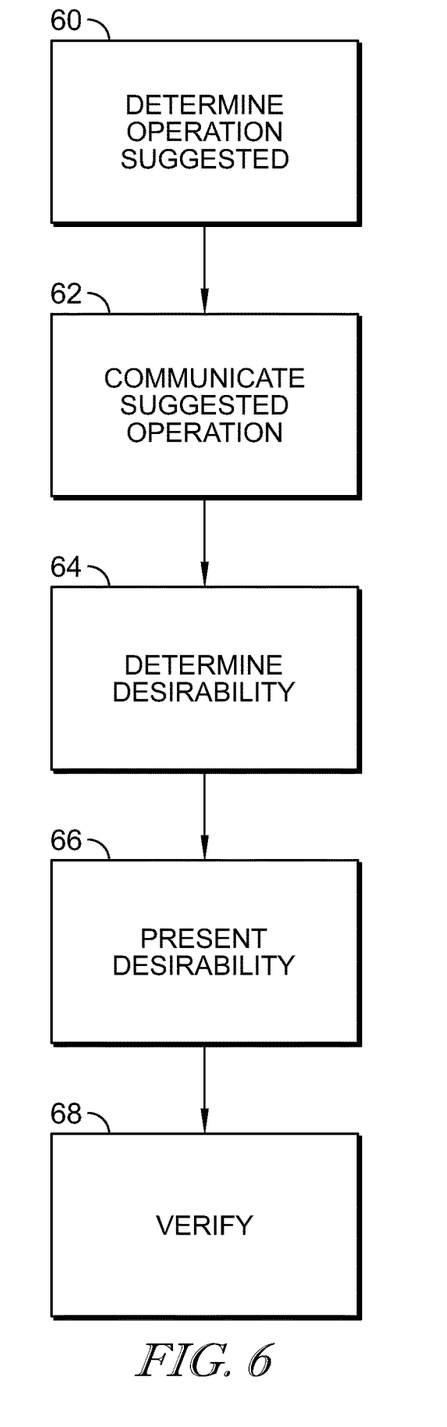
FIG. 6 is a flow diagram indicating a process of incentivizing compliance with suggested driving operations to mitigate traffic impedance.

Referring now to FIG. 6, an operational sequence of incentivization is shown including boxes 60-66. In box 60, a determination of the suggested operation may be performed. The suggested operation may be determined by the vehicle control system 16 on-board the vehicle 14, but in some embodiments, may be determined by remote content provider 40. In box 62, the suggested driving operation may be communicated to the user. In the illustrative embodiment, the user may be presented with the suggested driving operation via a display screen, but in some embodiments, the suggested driving operation may be communicated via any suitable manner, including but without limitation, audio, haptic, and/or other communication technique.

In box 64, the desirability of the suggested driving operation may be determined. The desirability may be determined as a value by the control system 16 and/or the content provider 40, based on any one or more of the features for consideration mentioned hereinabove, including but without limitation, the severity of the existing and/or impending traffic impedance, the potential for avoidance of traffic impedance, the perceived inconvenience to the user, and/or the likelihood that the user will comply with the suggested driving operation. The likelihood of compliance may consider factors such as the existing accumulated compliance rate.

In box 66, the desirability may be presented to the user. For example, the control system 16 may communicate with the user interface to display a value of desirability as an image on a display. The value of desirability may be presented as a potential additional accumulated compliance rating if compliance with the suggested driving operation is undertaken. In box 68, an optional verification may be performed. For example, the control system 16 may determine whether the speed, position, and/or RPM of the vehicle 14 indicates compliance with the suggested driving operation by comparison with predicted values. In some embodiments, the content provider 40 may determine whether compliance has occurred. In some embodiments, box 68 may include an authentication process, e.g., performed via the remote server 40 to authenticate that the vehicle 14 providing the information for verification is indeed the vehicle which performs the suggested driving operations.

Accordingly, the present disclosure includes devices, systems, and methods for incentivizing suggested driving operations by communicating benefits of compliance with the user of the vehicle. In some embodiments, compliance with the suggested driving operations may be linked to a material benefit to the user and/or vehicle 14. For example, accumulated scores above threshold may be awarded with tangible awards, for example, preferred roadway conditions, such as access to exclusive lanes of travel (carpool, low emission vehicle lanes, etc.), preferred parking status (low emission parking, etc.), and/or even preferred traffic signal operations in which communication to the traffic information system 26 that highly-compliant vehicle 14 is approaching may afford better traffic signal timing to the vehicle 14, further incentivizing other drivers to follow suit. In some embodiments, discounts and/or credits may be provided based on compliance, for example, payment may be afforded based on carbon offsets benefitting the vehicle fleet and/or traffic regulatory body. In some embodiments, the value of desirability may be determined according to the awards provided. Traffic flow control can be improved by such communications with the user of vehicle 14, and/or other vehicles.

In disclosed embodiments, verifying compliance may include determining whether the suggested driving operation has occurred. Verifying compliance may include, in response to successful confirmation that the suggested driving operation has occurred, presenting an accumulated compliance value determined according to the value of desirability. In disclosed embodiments, verifying compliance may include monitoring at least one of speed and location of the transportation vehicle for a predetermined period of time.

In disclosed embodiments, determining a suggested driving operation may include determining a likelihood of compliance with a suggested driving operation based on historical compliance information. Presenting the value of desirability may include presenting an offer of accumulated credit to a user's account based on the value of desirability to encourage compliance with the suggested driving operation.

Disclosed embodiments provide a system for incentivizing desirable driving habits for a user of a transportation vehicle which may comprise at least one processor configured to determine a suggested driving operation of the transportation vehicle to reduce and/or avoid traffic impedance, to communicate the suggested driving operation to the user for execution, to determine a value of desirability of the suggested driving operation, and at least one user interface in communication with the at least one processor. The at least one user interface may be configured to present the value of desirability to the user to encourage compliance with the suggested driving operation. In some embodiments, positive reinforcement for incentivizing operators to heed suggested driving operations may include pecuniary value, such as discounts on purchases, merchandise, and/or more direct value such as monetary compensation. In some embodiments, the value of desirability may include a correlation between the value of improvement to the traffic scenario, which can include the value of improvement to society at large, for example, carbon emission offsets generated as a result of compliance with the suggested driving operation may be correlated with the value of desirability, such as providing the complying operator with a portion of monetary value linked to the carbon offset credit attributed to the complying operation.

In disclosed embodiments, the at least one user interface may include a display for presenting the value of desirability to the user as a graphical image. Configuration to present the value of desirability may include presenting an accumulated compliance value determined according to the value of desirability.

In disclosed embodiments, configuration to determine the suggested driving operation may include configuration to determine a severity of the traffic impedance. The at least one processor may be configured to determine the suggested driving operation based on the severity of the traffic impedance. The at least one processor may be configured to verify compliance with the suggested driving operation.

In disclosed embodiments, configuration to verify compliance may include configuration to determine whether the suggested driving operation has occurred. Configuration to verify compliance may include, in response to successful confirmation that the suggested driving operation has occurred, communicating with the at least one interface to present an accumulated compliance value determined according to the value of desirability. In disclosed embodiments, configuration to verify compliance may include monitoring at least one of speed and location of the transportation vehicle for a predetermined period of time. Determining a suggested driving operation may include determining a likelihood of compliance with a suggested driving operation based on historical compliance information.

Disclosed embodiments include a method of traffic control which may comprise determining, by a processor, preferred traffic operations to reduce and/or avoid traffic impedance, selecting one or more transportation vehicles for execution of suggested driving operation to achieve the preferred traffic operations, communicating at least one suggested driving operation to the user of each of the selected transportation vehicles for execution, determining a value of desirability of the at least one suggested driving operation corresponding to each selected transportation vehicle, and presenting to the user, via at least one user interface, the value of desirability for each selected transportation vehicle to encourage compliance with the at least one corresponding suggested driving operation.

Although examples within the present disclosure may include discussion of a signal vehicle having suggested driving operations, embodiments within the present disclosure may include coordinated operations of any plurality of vehicles in a given area having suggested driving operations and/or considering that some of such vehicles may not comply with suggested driving operation. Such plurality of vehicle may include the same or similar suggested driving operations and/or individual suggested driving operations according to the particular traffic scenario. The present disclosure includes traffic sensors, such as traffic sensor loops, which may provide traffic related information as inputs for determining traffic signal operations and/or for consideration in determining suggested driving operations. In some embodiments, any manner of sensors may communication with a traffic management system to provide input information for determining suggested driving operations, such as position, speed, and/or volume sensors, and/or cameras, among others.

Although certain embodiments have been described and illustrated in exemplary forms with a certain degree of particularity, it is noted that the description and illustrations have been made by way of example only. Numerous changes in the details of construction, combination, and arrangement of parts and operations may be made. Accordingly, such changes are intended to be included within the scope of the disclosure, the protected scope of which is defined by the claims.

What is claimed is:

1. A method of determining and communicating a suggested driving operation to a user of a transportation vehicle, the method comprising:

receiving, by communication circuitry installed within the transportation vehicle, information from a traffic information system for consideration in determining a suggested driving operation, determining, by a processor installed within the transportation vehicle, based on the received information, a suggested driving operation of the transportation vehicle to reduce traffic impedance, wherein the determining of the suggested driving operation includes calculating a suggested speed based on the information received from the traffic information system, communicating the suggested driving operation to the transportation vehicle user for execution including outputting the suggested driving operation onto at least one user interface including a display for presentation to the transportation vehicle user, determining a value of desirability of the suggested driving operation, determining an accumulated compliance value based on historical compliance information, and presenting both the value of desirability and the accumulated compliance value together, as a graphical image on the display of the at least one user interface, to the transportation vehicle user to encourage compliance with the suggested driving operation, wherein the value of desirability is presented as a potential additional accumulated compliance rating if compliance with the suggested driving operation is undertaken.

2. The method of claim 1, wherein determining the value of desirability includes determining a severity of the traffic impedance, and the suggested driving operation is determined based on the severity of the traffic impedance.

3. The method of claim 1, further comprising verifying compliance with the suggested driving operation.

4. The method of claim 3, wherein verifying compliance includes determining whether the suggested driving operation has occurred, and the method further comprises, in response to successful confirmation that the suggested driving operation has occurred, presenting the accumulated compliance value determined according to the value of desirability.

5. The method of claim 3, wherein verifying compliance includes monitoring at least one of speed and location of the transportation vehicle for a predetermined period of time.

6. The method of claim 1, wherein the determining of the likelihood of compliance with suggested driving operation is based on historical compliance information.

7. The method of claim 1, wherein the accumulated compliance value comprises an accumulated value of a preferred vehicular-access status award comprising preferred traffic signal operations.

8. The method of claim 1, wherein the accumulated compliance value comprises an accumulated value of a preferred vehicular-access status award comprising access to exclusive lanes of travel comprising at least one of carpool lanes and low-emission vehicle lanes.

9. The method of claim 1, wherein the accumulated compliance value comprises an accumulated value of a preferred vehicular-access status award comprising preferred parking status includes low-emission vehicle parking status.

10. The method of claim 1, further comprising communicating a compliance indication to other vehicles on the roadway execution of the suggested driving operation.

11. The method of claim 1, wherein receiving information from a traffic information system includes receiving traffic signal information.

12. The system of claim 11, wherein calculating the suggested driving operation includes determining a suggested reduced speed based on the received traffic signal information to delay arrival at the traffic signal.

13. A vehicle control system onboard a transportation vehicle for determining and communicating a suggested driving operation to a user of a transportation vehicle, the vehicle control system comprising:

communication circuitry for receiving information from a traffic information system for consideration in determining a suggested driving operation, at least one processor configured to execute instructions stored on memory, to determine a suggested driving operation of the transportation vehicle to reduce traffic impedance based on the received information, wherein the determining of the suggested driving operation includes calculating a suggested speed based on information received from the traffic information system, to communicate the suggested driving operation to the transportation vehicle user for execution, to determine a value of desirability of the suggested driving operation, and to determine an accumulated compliance value based on historical compliance information, and at least one user interface in communication with the at least one processor, the at least one user interface including a display, the user interface configured to present both the value of desirability and the accumulated compliance value together to the transportation vehicle user as a graphical image to encourage compliance with the suggested driving operation, wherein the value of desirability is presented as a potential additional accumulated compliance rating if compliance with the suggested driving operation is undertaken.

14. The system of claim 13, wherein the at least one processor is configured to determine a severity of the traffic impedance, and the at least one processor is configured to determine the suggested driving operation based on the severity of the traffic impedance.

15. The system of claim 13, wherein the at least one processor is configured to verify compliance with the suggested driving operation including to determine whether the suggested driving operation has occurred, and in response to successful confirmation that the suggested driving operation has occurred, communicating with the at least one interface to present an accumulated compliance value determined according to the value of desirability.

16. The system of claim 15, wherein the at least one processor is configured to verify compliance includes monitoring at least one of speed and location of the transportation vehicle for a predetermined period of time.

17. The system of claim 13, wherein the determining of the suggested driving operation includes determining a likelihood of compliance with the suggested driving operation based on historical compliance information.

18. The system of claim 13, wherein the accumulated compliance value comprises an accumulated value of a preferred vehicular-access status award comprising preferred traffic signal operations.

19. The system of claim 13, wherein the accumulated compliance value comprises an accumulated value of a preferred vehicular-access status award comprising exclusive lanes of travel comprising at least one of carpool lanes and low-emission vehicle lanes.

20. The system of claim 13, wherein the accumulated compliance value comprises an accumulated value of a preferred vehicular-access status award comprising preferred parking status includes low-emission vehicle parking status.

21. The system of claim 13, wherein the at least one processor is further configured to communicate a compliance indication to other vehicles, responsive to execution of the suggested driving operation.

\* \* \* \* \*

UNITED STATES PATENT AND TRADEMARK OFFICE
CERTIFICATE OF CORRECTION

| | |
|---|---|
| PATENT NO. | : 11,600,173 B2 |
| APPLICATION NO. | : 16/507810 |
| DATED | : March 7, 2023 |
| INVENTOR(S) | : Liang Kong et al. |

It is certified that error appears in the above-identified patent and that said Letters Patent is hereby corrected as shown below:

In the Claims

Claim 30 should read:
The method of claim 12, wherein calculating the suggested driving operation includes determining a suggested reduced speed based on the received traffic signal information to delay arrival at the traffic signal.

Signed and Sealed this
Seventeenth Day of October, 2023

Katherine Kelly Vidal
*Director of the United States Patent and Trademark Office*